United States Patent [19]

Yoshinobu

[11] Patent Number: 5,699,104

[45] Date of Patent: Dec. 16, 1997

[54] BROADCAST CHANNEL LOCK SYSTEM

[75] Inventor: Hitoshi Yoshinobu, Kanagawa, Japan

[73] Assignee: Sony Corporation, Tokyo, Japan

[21] Appl. No.: 355,383

[22] Filed: Dec. 13, 1994

[30] Foreign Application Priority Data

Dec. 14, 1993 [JP] Japan ................. P05-313351

[51] Int. Cl.$^6$ ............... H04N 7/16; H04N 7/167
[52] U.S. Cl. ............... 348/5.5; 380/7; 380/10; 380/20
[58] Field of Search .............. 380/20, 23, 49, 380/5, 7, 10; 348/5.5

[56] References Cited

U.S. PATENT DOCUMENTS

| | | | |
|---|---|---|---|
| 4,225,884 | 9/1980 | Block et al. | 380/20 |
| 4,329,684 | 5/1982 | Monteath et al. | |
| 4,390,901 | 6/1983 | Keiser . | |
| 4,488,179 | 12/1984 | Krüger et al. | |
| 4,528,589 | 7/1985 | Block et al. | 380/20 |
| 4,635,121 | 1/1987 | Hoffman et al. | |
| 4,706,121 | 11/1987 | Young . | |
| 4,888,796 | 12/1989 | Olivo, Jr. | 348/5.5 X |
| 4,930,158 | 5/1990 | Vogel | 380/20 X |
| 5,151,789 | 9/1992 | Young . | |
| 5,191,410 | 3/1993 | McCalley et al. | |
| 5,195,135 | 3/1993 | Palmer | 380/20 |

*Primary Examiner*—Bernarr E. Gregory
*Attorney, Agent, or Firm*—Jay H. Maioli

[57] ABSTRACT

A broadcasting channel lock system including a broadcasting device for transmitting a broadcasting signal via one or more of a plurality of channels, and a receiving device for receiving the broadcasting signal. The receiving device is provided with a locking device for limiting reception of video and/or audio via a specific one or more of the channels. A screen saver is incorporated as a part of the locking device for limiting the video reception so as to allow the user to partially view the video in the specific channel, thereby stimulating the interest of the user to the contents in the specific channel.

21 Claims, 14 Drawing Sheets

FIG. 3

| BUTTON | CHANNEL | SCREEN SAVER |
|---|---|---|
| 1 | — | — |
| » 2 | UNDEFINED | 01 UNDEFINED CHANNEL |
| 3 | 3 | — |
| 4 | 4 | — |
| 5 | 21 | 02 FIREWORKS |
| 6 | 6 | — |
| 7 | 42 | 03 MTV TITLE |
| 8 | 8 | — |
| 9 | 53 | 04 TURTLE |
| 10 | 10 | — |
| 11 | UNDEFINED | 01 UNDEFINED CHANNEL |
| 12 | 12 | — |

PRESS ANY BUTTON DECIDED

O1

O2 ANIMATION OF FIREWORKS

03

04 ANIMATION OF TURTLE MOVING SLOWLY (VIDEO IMAGE OVERLAID WITH SCREEN SAVER CAN BE PARTIALLY VIEWED THROUGH A TURTLE SHELL. A PART OF THE VIDEO IMAGE ALLOWED TO BE VIEWED IS VARIED BY MOVEMENT OF THE ANIMATED TURTLE.)

FIG. 11

| SETTING INFORMATION | VIDEO LEVEL |
|---|---|
| 0 | COMPLETELY VISIBLE |
| 1 | LEVEL 1 (LITTLE INVISIBLE) |
| 2 | LEVEL 2 (MORE INVISIBLE) |
| 3 | LEVEL 3 (COMPLETELY INVISIBLE) |
| 4 | PARTIALLY VISIBLE |
| 5 | STROBOSCOPICALLY VISIBLE |

FIG. 12

| SETTING INFORMATION | AUDIO LEVEL |
|---|---|
| 0 | COMPLETELY AUDIBLE |
| 1 | LEVEL 1 (LITTLE INAUDIBLE WITH NOISE) |
| 2 | LEVEL 2 (MORE INAUDIBLE WITH NOISE) |
| 3 | LEVEL 3 (COMPLETELY INAUDIBLE WITH NOISE) |
| 4 | SOMETIMES INAUDIBLE |
| 5 | MUTE |

(ORIGINAL VIDEO IMAGE)
(LEVEL 0)

(HARDLY VISIBLE)
(LEVEL 2)

(COMPLETELY INVISIBLE)
(LEVEL 3)

(PERTIALLY VISIBLE)
(LEVEL 4)

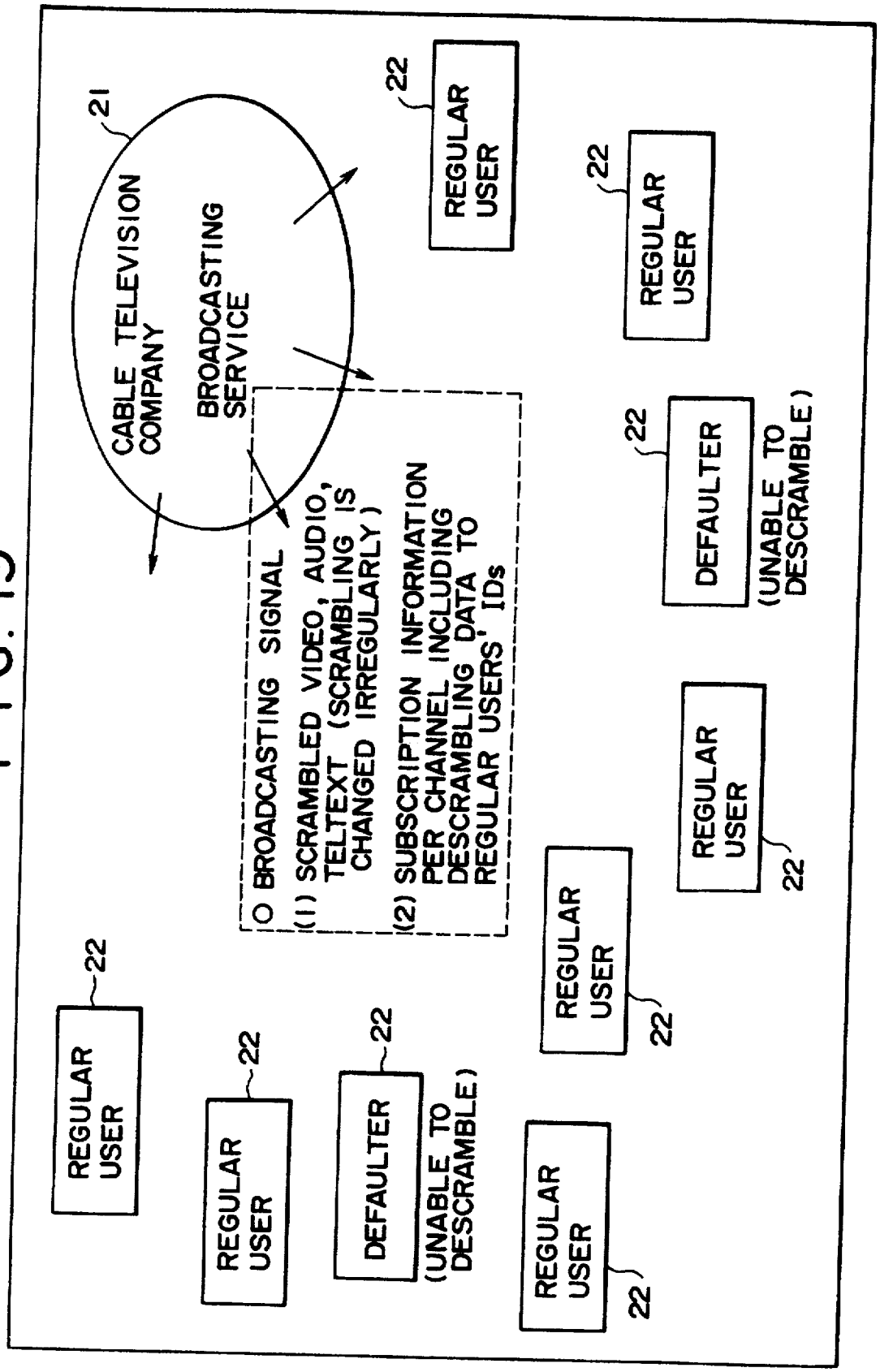

BROADCAST CHANNEL LOCK SYSTEM

FIELD OF THE INVENTION

The present invention relates to a broadcasting channel lock system for locking a specific one or more broadcast channels out so that they may not be viewed/received by unauthorized subscribers. The present invention acts to render the contents of the specific channel fully or only partially unintelligible, and is particularly useful as broadcasting channel lock system for limiting the view of pay broadcasting for nonsubscribers, defaulters, etc. at the side of the receiver.

BACKGROUND OF THE INVENTION

In recent years, pay broadcasting such as satellite broadcasting and cable television has become more popular worldwide and yet has met with varying needs of TV users. The satellite broadcasting is a broadcasting system such that a broadcasting wave transmitted from a satellite is received by the users, while the cable television is a broadcasting system such that a broadcasting wave transmitted from a satellite or a ground wave-transmitted from a terrestrial station is once received by a CATV station and is then distributed through cables to the users.

The cable television is popular particularly in United States so that more than 50 channels are available or 500 channels are theoretically possible. Accordingly, competition in audience ratings between program originating companies is keen.

In general, an essential principle in the pay broadcasting is that the users having paid for a broadcasting service are allowed to view programs, but any other users not having paid for the broadcasting service are disallowed to view the programs. To this end, a so-called channel lock is necessary in the pay broadcasting.

A channel lock system for the pay broadcasting in the related art is shown in FIG. 19. As shown in FIG. 19, the channel lock system employs a scrambling method used in the art such that a broadcasting signal is electrically scrambled by a pay broadcasting station 21 and this scrambled broadcasting signal received by receivers 22 owned by subscribers is descrambled for viewing by the receivers 22.

Various known techniques for realizing the scrambling method, have been developed. For example, the techniques relating to video signals include a synchronizing signal suppressing method, polarity inverting method, scanning lines transferring method, etc., while the techniques relating to audio signals include a cryptographic method.

Scrambling patterns applied to the video and audio by the various methods mentioned above are different. In any case, unless the scrambled video and audio are descrambled, the broadcasting cannot be viewed.

Therefore, the pay broadcasting station broadcasts descrambling pattern data for descrambling the video and audio in the receivers of the subscribers, thereby allowing the subscribers to view the programs.

A first condition for any user to view the programs in the pay broadcasting is to subscribe for reception of any channel from the broadcasting station, or service provider; and attach to the receiver a decoder having a function of using the descrambling pattern data, and a second condition is to pay a prescribed subscription fee.

To enable only the subscribers satisfying the above two conditions to view the programs, the pay broadcasting station applies unique identifier information, or ID code, to the decoders owned by the subscribes for the purpose of identifying the subscribers and informs the subscribers decoder, or receiver, of the presence or absence of qualification of use of the descrambling pattern data by transmitting an appropriate. ID code.

In other words, the pay broadcasting station changes a scrambling pattern irregularly and broadcasts descrambling pattern data for descrambling the scrambling pattern together with multiplex data of ID code for identifying the subscribers qualified to use the descrambling pattern data (i.e., the subscribers having paid the fee).

In the decoders owned by the qualified subscribers having the IDs coincident with the ID code contained in the transmitted multiplex data, the current descrambling pattern data is replaced by the new descrambling pattern data to thereby enable descrambling of the scrambling pattern after it has been changed. Thus, the qualified subscribers can continue to view the programs.

On the other hand, in the decoders owned by the defaulters not having paid the fee, the IDs of the decoders are not coincident with the IDs contained in the multiplex data, so that the descrambling pattern data cannot be received, thereby hindering descrambling of the scrambling pattern after it has been changed.

In this manner, only the subscribers having paid the fee are allowed to view the programs in the pay broadcasting.

An object of the pay broadcasting is to make a profit, so that pay broadcasting companies are required to always aim at an increase in number of regular subscribers. To this end, it is necessary for the pay broadcasting companies to have another policy such as to inform the nonsubscribers and the defaulters also of the contents of the programs, hopefully thereby stimulating an interest in the programs and causing the non subscriber and defaulters to subscribe to the pay TV service or make payment. In these circumstances, some broadcasting stations change the scrambling method or the scrambling pattern per channel to relax the limitation of viewing to nonsubscribers and defaulters for a limited period of time to promote their broadcast programming services.

Further, in the case of cable television, the programs in all channels to be broadcast through the cable are not originated by a single company, but in many cases, channels are shared by a plurality of, broadcasting companies. Accordingly, it is expected that there is a difference between the broadcasting companies in handling the balance of the above-mentioned two policies regarding the setting of scrambling.

Incidentally, the term of "screen saver" used in the present invention will now be described. To "screen save" originally means to prevent sticking of a fluorescent film (screen) of a CRT in a computer display technology when the same image continues to be displayed on the screen of the CRT.

The "screen saver" originally means an image to be displayed automatically instead of an original video image when no key input continues to be made for a given period of time. Being shifted from this meaning, the "screen saver" also means an unrelated image to be superimposed on an original video image. It will be recognized, however, that a related image may also be used as a "screen saver" image.

Conventionally, a black image(blank screen), line drawing, etc. have been used as the screen saver, and there is a recent marked trend that the screen saver is regarded as an interior design for providing pleasant working environment by display on the screen of the CRT. Accordingly, bright, showy, and animated images have recently been used as the screen saver.

Many pay broadcasting stations adopting the channel lock system with the conventional scrambling method apply different types of scrambling methods, or even in the case where the same scrambling method is employed in a certain pay broadcasting station, different kinds of scrambling patterns are transmitted through different channels. As a result, any subscriber who wants to view programs in a plurality of channels is required to set a plurality of decoders, thus causing a heavy burden on such a subscriber.

Further, in the cable television, it is unnecessary for any subscriber to set a plurality of decoders because one kind of scrambling pattern is transmitted. However, since many channels are present and a plurality of broadcasting companies sharing the channels have different business policies as mentioned above, it is difficult to take measures for causing the desire of the subscribers for viewing per channel.

SUMMARY OF THE INVENTION

It is accordingly an object of the present invention to provide a broadcasting channel lock system and a transmitting method for a broadcasting signal with a simple configuration which allows the regular subscribers who have paid the appropriate viewing/audience fee to fully view broadcast programs as an essential principle of pay broadcasting, and also allows the nonsubscribers or the defaulters to partially view the contents of a specific channel, hopefully thereby causing them to subscribe for full viewing service of the broadcasting and pay the subscription fee associated therewith.

According to one an aspect of the present invention, there is provided a broadcasting channel lock system comprising broadcasting means for transmitting a broadcasting signal over one or more of a plurality of available broadcast channels, and a plurality of receiving means for receiving the broadcasting signal and wherein the broadcasting signal contains a signal for controlling each of the receiving means.

According to another aspect of the present invention, there is provided a broadcasting channel lock system comprising broadcasting means for, transmitting a broadcasting signal which is composed of a plurality of channels, a plurality of receiving means for receiving the broadcasting signal, and wherein each of the receiving means is provided with locking means for limiting the reception of a video signal and/or an audio signal in a specific one of the channels. The locking means is controllable by, or responsive to, information transmitted by the broadcasting signal.

Preferably, control of the locking means by the broadcasting signal is performed according to IDcode information, or numbers, contained in the broadcasting signal. The locking means for limiting the video reception sets a degree of unintelligibility of the video to a predetermined level which may range from a completely visible condition to a completely distorted, or invisible, condition. The locking means for limiting the video comprises means for displaying a predetermined screen saver on a display screen. The screen saver may be arbitrarily selected from a plurality of available screen savers. The screen saver is displayed on the display screen so as to overlay the video in the specific channel to be locked. The screen saver is displayed on the display screen so as to preclude full viewing of the video. The locking means for limiting the audio sets a degree of unintelligibility of the audio to a predetermined level which may range from a completely audible condition to a completely inaudible, or distorted, condition. Setting of the degree of unintelligibility or the video and/or audio is performed according to a setting information signal contained in the broadcasting signal.

The broadcasting channel lock system according to the present invention operates as follows: (1) in the broadcasting channel lock system comprising broadcasting means for transmitting a broadcasting signal via one or more of a plurality of available channels, and a plurality of receiving means for receiving the broadcasting signal, the broadcasting signal contains a signal for controlling each of the receiving means, and each of the receiving means is provided with locking means for limiting the video and/or audio in a specific one of the channels. Accordingly, a burden on the broadcasting means, e.g., a burden of scrambling the broadcasting signal can be eliminated to allow easy locking of a specific channel.

(2) The locking of the specific channel is performed according to the ID numbers corresponding to each of the plurality of receiving means. Accordingly, reliable channel locking by the receiving means owned by the nonsubscribers or the defaulters can be effected.

(3) The locking means for locking the specific channel to limit the video comprises means for displaying a screen saver on a display screen. Accordingly, the screen saver such as an animation, graphics or textual characters can be displayed to indirectly urge or prompt, the user to subscribe for reception or pay the requisite fee.

(4) A plurality of kinds of screen savers are preliminarily set and one of them is arbitrarily selected to be displayed. Accordingly, the screen saver selected can be easily set or brought into use.

(5) The screen saver is displayed on the display screen so as to overlay the video in the specific channel to be locked, and make the video only partially visible or completely invisible. For example, the original video in the specific channel may be partially viewed through a part of an animation displayed as the screen saver on the display screen, thereby letting the user to only imagine the full video content of the broadcasting.

(6) The locking means for limiting the video and/or audio sets level setting information related to the video to a predetermined level which may range from a completely visible condition to a completely distorted, or invisible, condition. It also sets the level setting information relating to the audio to a predetermined level which may range from a completely audible and discernible condition to a completely inaudible, or undiscernible, condition. Accordingly, in addition to setting of the completely invisible condition, the video image can be made only partially visible and/or the sound can be made inaudible or undiscernible in quality. Thus, various screen conditions can be realized in order to let the user only imagine or guess at what the full content of the broadcasting may be.

Other objects and features of the invention will be more fully understood from the following detailed description and appended claims when taken with the accompanying drawings.

BRIEF DESCRIPTION OF THE DRAWINGS

FIG. 3 is a view illustrating an example of a menu for setting a screen saver.

FIG. 11 is a view illustrating the contents of a video level contained in a cable box ID of the present invention;

FIG. 12 is a view illustrating the contents of an audio level contained in a cable box ID of the present invention;

FIG. 19 is a schematic block diagram showing a general configuration of a channel lock system for pay broadcasting.

DETAILED DESCRIPTION OF THE PREFERRED EMBODIMENTS

Some preferred embodiments of the broadcasting channel lock system according to the present invention will now be described with reference to the drawings.

Figure 1:
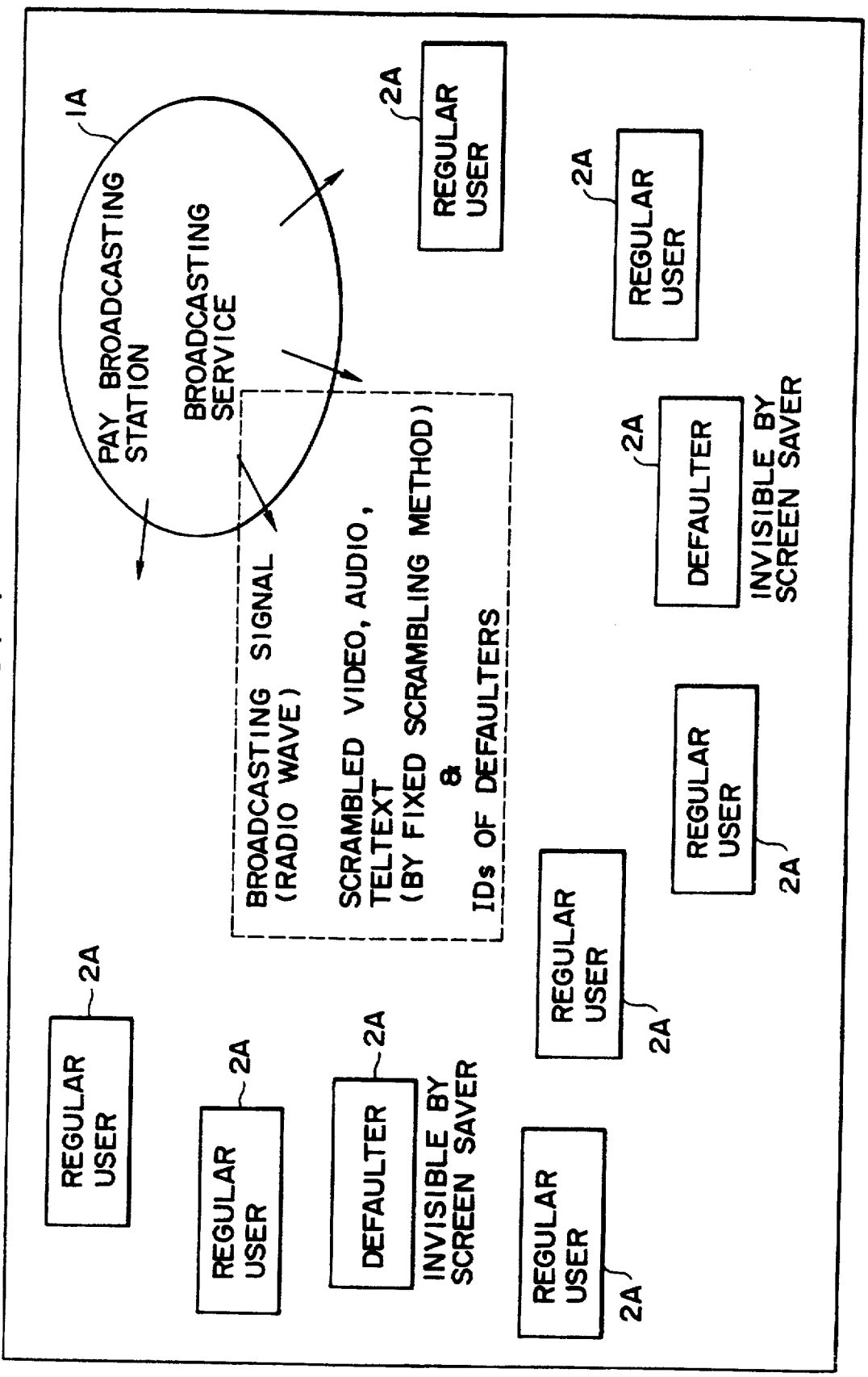
FIG. 1 is a diagram showing the general configuration of a broadcasting channel lock system according to the present invention.

Referring to FIG. 1, there is shown a first preferred embodiment of the broadcasting channel lock system according to the present invention, in which all users are supplied with a broadcasting signal scrambled by a fixed scrambling method, and the broadcasting signal is composed of a video signal, an audio signal, and identifier information, or ID code, to identify nonsubscribers and defaulters. Such identifier information, or ID code, could also be transmitted to identify authorized subscribers.

The system according to this preferred embodiment will be described in more detail in respect of the following items.
[1] Broadcasting System Employing a Fixed Scrambling Method;
[2] Configuration of Receiver 2A;
[3] Screen Saver for Video Only;
 (1) Setting of Screen Saver in Each Channel
 (2) Starting of Screen Saver upon Channel Selection to Ending of Screen Saver;

These items will be referred to in the above order of arrangement.

[1] Broadcasting System Employing a Fixed Scrambling Method

As shown in FIG. 1, the broadcasting system employing the broadcasting channel lock system according to the first preferred embodiment is designed so that a video signal only is subjected to a screen saver and sound to be reproduced during display of the screen saver is set as sound received, mute, or sound suitably set.

Prerequisite conditions for this broadcasting system are to employ a television or a receiver 2A incorporating a tuner, capable of selecting one of several kinds of screen savers for any channel of music or audio only broadcasting, adult broadcasting, and any other broadcast for which it is desired to have locked out, and displaying the selected screen saver upon selection of the channel on which such broadcast is provided.

The broadcasting signal scrambled by the fixed scrambling method is broadcast from a pay broadcasting station 1A as broadcasting means. The broadcasting signal transmitted is received by the receivers 2A as receiving means owned by all subscribers. However, the screen saver is displayed on video received by the receivers 2A owned by the defaulters, so that the defaulters cannot view the received video.

The broadcasting signal contains unique ID information, or codes, corresponding to all the receivers 2A, and the screen saver is automatically started when the same ID code as that corresponding to each receiver 2A is received, thereby making the broadcasting invisible, or otherwise unviewable, via the display of the screen saver. According to this system, the broadcasting cannot be viewed by the nonsubscribers and the defaulters. To realize this system, the unique ID numbers must be preliminarily set in all the receivers 2A.

In this manner, by controlling the viewability of the broadcasting on the receivers 2A, that is, by containing the unique ID numbers identifying the nonsubscribers and the defaulters in the broadcasting signal, it is unnecessary to change a scrambling method itself, prepare a descrambling data table, etc., and the broadcasting signal scrambled by the same scrambling method at all times can be supplied.

It is considered that the number of the defaulters is almost smaller than the number of the regular subscribers who have paid the fee, and it is further considered that the number of the subscribers is larger than the number of the nonsubscribers who have bought the receivers 2A but have not yet subscribed for reception of the broadcasting. Accordingly, the amount of data of the ID numbers contained in the broadcasting signal is smaller than the total amount of data of the ID numbers to be used in this system.

In a cable box for cable television aside from a decoder for satellite broadcasting, such a function as mentioned above may be added to thereby construct the system employing the scrambled broadcasting signal inexpensively and simply, thereby preventing the specific users such as the nonsubscribers and the defaulters from viewing the broadcasting.

Further, the display of any image on a screen as of a CRT or the like by using the screen saver rather than the display of no image in a sandstorm screen condition allows the users to recognize the reception of the broadcasting signal.

Further, the display of the screen saver may indirectly inform the users of any inconvenient matter, and some subscribers may select the viewability not only for each channel but also for each broadcast program or each broadcast time.

In setting a channel by the regular subscribers who have paid the fee, a change of the channel set may be made impossible as far as any initialized password, physical key, or key card is not input. Thus, the channel lock with some users specified may be effected.

In this manner, when such specific users intend to view the broadcasting in the channel arbitrarily locked, the setting of the channel must be changed. Further, the screen saver may be erased by operating a one-touch button of a remote commander.

As another manner of use, when any user intends to temporarily cut off the program during viewing (ex: because it is violent or vulgar, etc.) at one time, the user may start the screen saver at this time to make the visual image only of the program temporarily invisible. Thereafter, the user may erase the screen saver. Thus, the screen saver may be used like a "video mute".

[2] Configuration of Receiver 2A

Each receiver 2A may incorporate a software program for displaying various kinds of screen savers corresponding to the various video levels.

Figure 2:
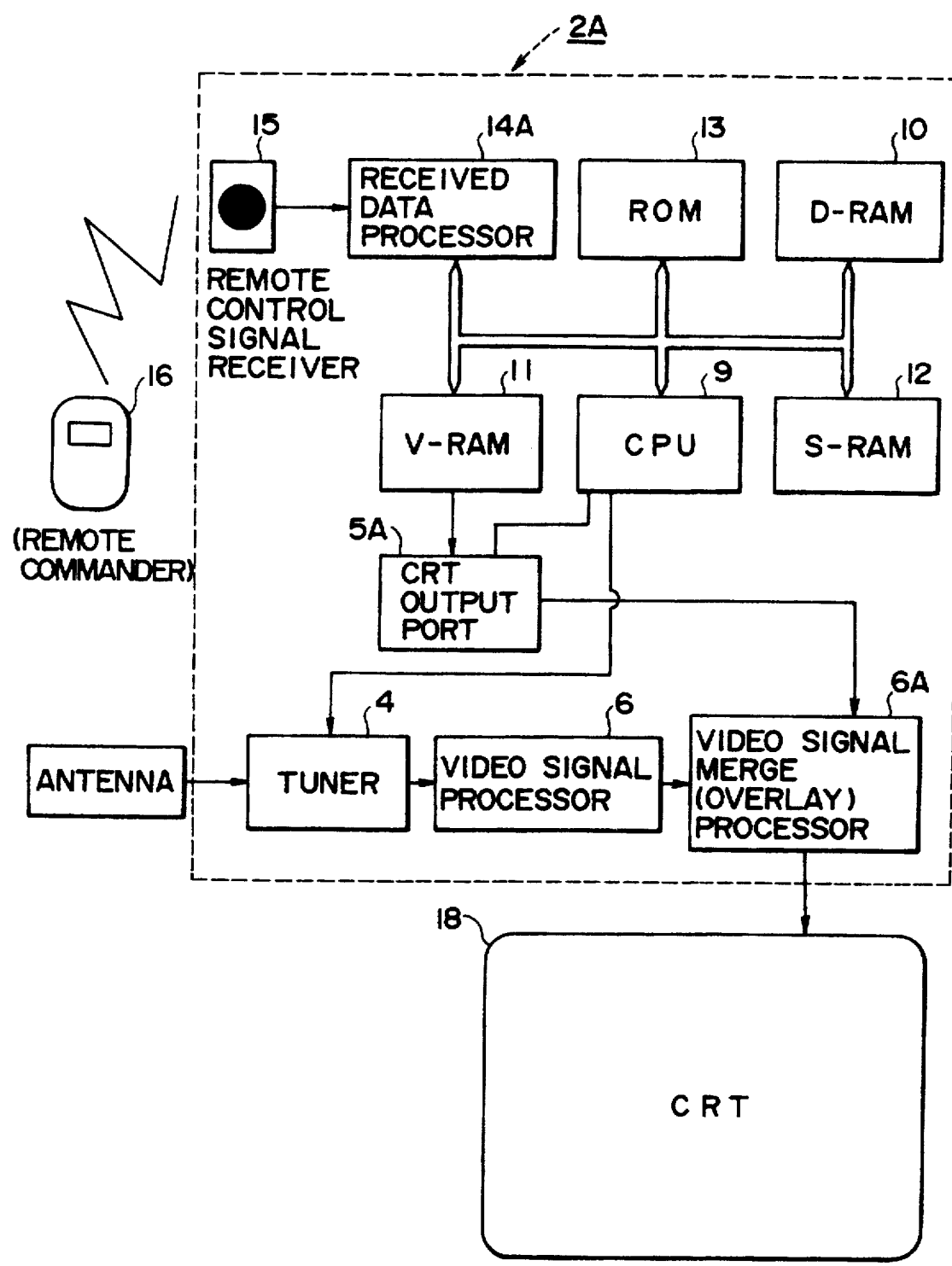
FIG. 2 is a schematic block diagram showing the configuration of each receiver.

As shown in FIG. 2, each receiver 2A includes a tuner 4, CRT output port 5A, video signal processor 6, video signal merge (overlay) processor 6A, CPU 9, D-RAM 10, V-RAM 11, S-RAM 12, ROM 13, received data processor 14A, remote control signal receiver 15, remote commander 16, and display 18.

The tuner 4 has an input connected to an antenna or a cable, an output connected to the video signal processor 6, and a control terminal connected to a given control port of the CPU 9.

The CRT output port 5A functions to feed to the video signal merge (overlay) processor 6A a video signal for displaying a screen saver based on a command signal from the remote commander 16. The CRT output port 5A has an input connected to the V-RAM 11, an output connected to the video signal merge (overlay) processor 6A, and a control terminal connected to the CPU 9.

The video signal processor 6 has an input connected to the tuner 4 and an output connected to the video signal merge (overlay) processor 6A.

The video signal merge (overlay) processor 6A functions to generate a video signal for merging or overlaying a video signal for displaying a screen saver with or on a video signal of each channel received from the antenna, and to display the video signal thus generated on the display 18 as a CRT. The video signal merge (overlay) processor 6A has inputs connected to the CRT output port 5A and the video signal processor 6 and an output connected to the display 18.

The CPU 9 is connected through a system bus to external memories and the like, and functions to execute the program and communicate the signals between the various circuit blocks, thereby generally controlling the receiver 2A.

The D-RAM 10 is a so-called dynamic RAM, which is connected through the system bus to the CPU 9 and functions to provide a working area when the CPU 9 executes the program.

The V-RAM 11 is connected through the system bus to the CPU 9 and functions to store image data per screen for displaying a screen saver. This image data is generated by the CPU 9 with use of graphic data and font data stored in the ROM 13.

The S-RAM 12 is a so-called static RAM, which is constructed as a nonvolatile memory and is connected through the system bus to the CPU 9. The S-RAM 12 functions to store information of the screen saver set.

The ROM 13 is a read only memory, which is connected through the system bus to the CPU 9. The ROM 13 preliminarily stores various programs and fixed data such as graphic data for displaying animations and font data for displaying characters. A required one of the programs is read from the ROM 13 and is executed by the CPU 9. The graphic data and the font data are read by the CPU 9 when the image data mentioned above is generated.

The received data processor 14A functions to decode the command signal from the remote commander 16. The received data processor 14A has an input connected to the remote control signal receiver 15 and an output connected to the system bus.

The operation of the receiver 2A configured above in relation to the screen saver will now be described in the following item [3].

[3] Screen Saver for Video Only (1) Setting of Screen Saver in Each Channel

The setting of the screen saver in each channel can be effected by the user through the remote commander 16, for example.

That is, when a channel setting button provided in the remote commander 16 is depressed by the user, a channel setting command is transmitted from the remote commander 16 to the receiver 2A.

This channel setting command is received by the remote control signal receiver 15 of the receiver 2A, and is then decoded by the received data processor 14A.

A graphic display function from the decoded command is then used to display a channel setting menu on the CRT as the display 18.

This channel setting menu is shown in FIG. 3 by way of example. This menu is composed of the numbers of buttons "1" to "12", the kinds of channels to be set, and the kinds of screen savers, may be displayed on the screen in some order such as a column or row.

For example, the button "1" corresponds to a channel "1", and no screen saver is defined in this channel.

Figure 4:
FIG. 4 is a view illustrating an example of the screen saver as a message comprised of textual characters.

The button "2" corresponds to an undefined channel, and a screen saver "01 undefined channel" is displayed in this channel. As shown in FIG. 4, this screen saver "01 undefined channel" is displayed as a message of "No. program is broadcast in this channel", for example, at a suitable location on the CRT.

Figure 5:
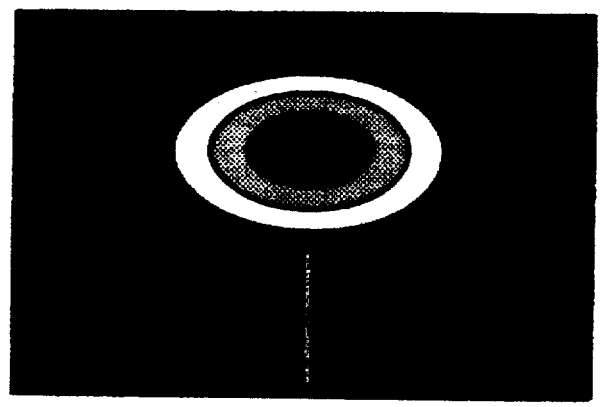
FIG. 5 is a view illustrating another example of the screen saver as an animation.

The button "5" corresponds to a channel "21", and a screen saver "02 fireworks" is displayed in this channel. As shown in FIG. 5, this screen saver "02 fireworks" is displayed as an animation of fireworks on the CRT.

Figure 6:
FIG. 6 is a view illustrating another example of the screen saver as a program title.

The button "7" corresponds to a channel "42", and a screen saver "03 MTV title", for example, is displayed in this channel. As shown in FIG. 6, this screen saver "03 MTV title" is displayed as a message of "Music TV", for example, on the CRT.

Figure 7:
FIG. 7 is a view illustrating another example of the screen saver as an animation with a part of an original video image allowed to be viewed.

The button "9" corresponds to a channel "53", and a screen saver "04 turtle" is displayed in this channel. As shown in FIG. 7, this screen saver "04 turtle" is displayed as an animation of a turtle moving slowly from the left to the right on the screen of the CRT, in which a video image overlaid with the screen saver can be partially viewed through a shell of the turtle, so that a part of the video image allowed to be viewed through the shell is varied by the movement of the turtle.

In this manner, the buttons of the remote commander are sequentially operated to set the channel number and the kind of the screen saver corresponding to each channel. After the setting of each channel is completed, the information set is stored into the S-RAM 12, and is referred to upon channel selection.

(2) Starting of Screen Saver upon Channel Selection to Ending of Screen Saver

Figure 8:
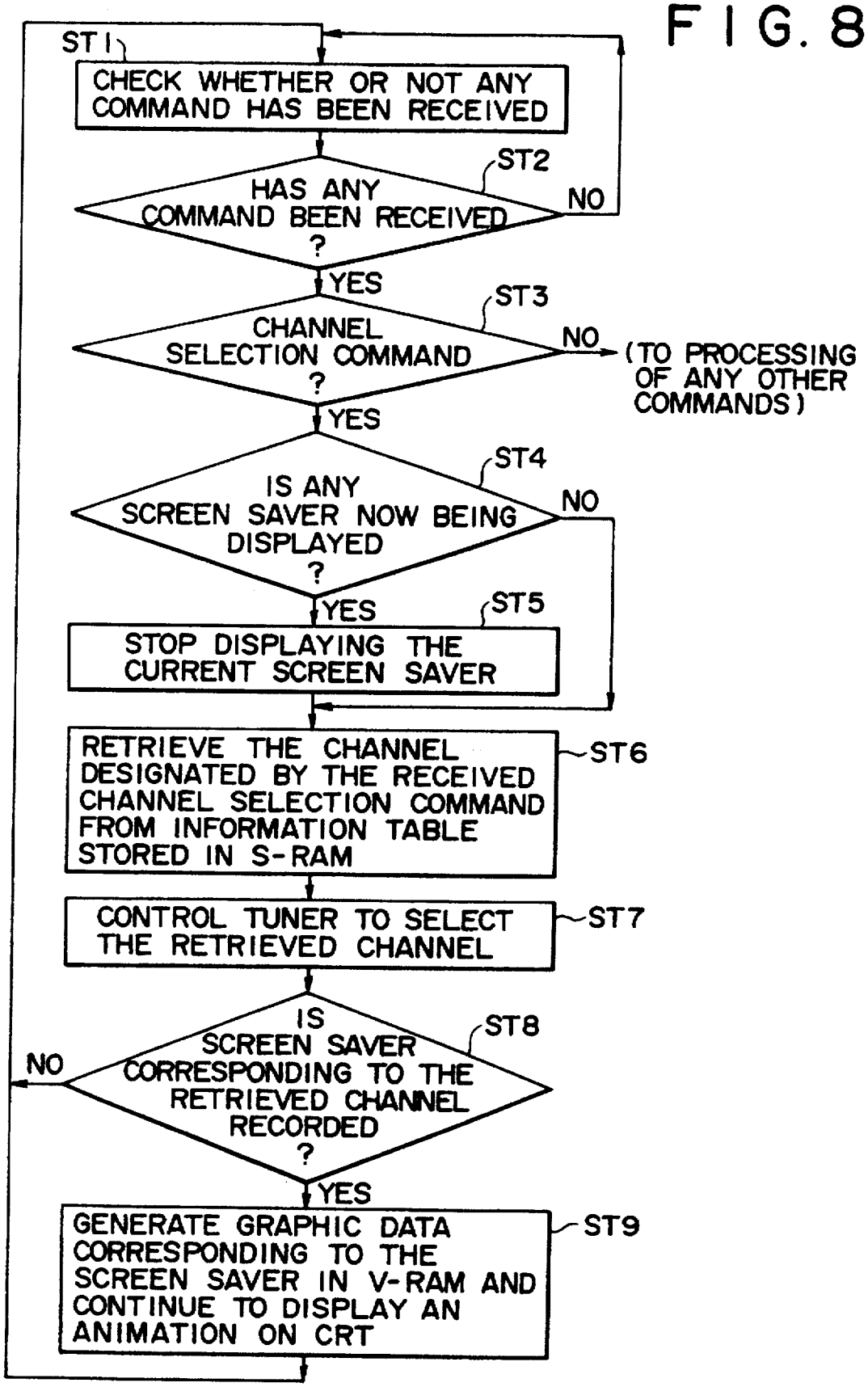
FIG. 8 is a flowchart of channel selection processing to be performed in the receiver shown in FIG. 2

The screen saver set in the channel desired is started upon Channel selection as shown in FIG. 8.

First, the receiver 2A receives infrared radiation from the remote commander 16 and decodes it to check whether or not any command has been received (step ST1).

When the user depresses any channel button of the remote commander 16 during viewing to select a desired channel, a command signal is generated from the remote commander 16. This command signal is received by the remote control signal receiver 15 and is then input through the system bus into the CPU 9, in which the command signal is decoded (step ST2).

The CPU 9 determines whether or not the command signal decoded is a channel selection command. If the command signal decoded is not a channel selection command, the CPU 9 performs processing of any other commands (step ST3).

If the command signal decoded is a channel selection command, the CPU 9 determines whether or not any screen saver is being displayed in a current channel (step ST4).

If any screen saver is now being displayed, the CPU 9 controls the CRT output port 5A to stop displaying the screen saver such as an animation in the current channel (step ST5).

Then, the CPU 9 checks whether or not the screen saver corresponding to the channel designated by the channel selection command received is recorded in an information table stored in the S-RAM 12 (step ST6).

Then, the CPU 9 controls the tuner 4 to select the desired channel (step ST7).

If the screen saver corresponding to the desired channel is recorded in the information table, the graphic data corresponding to this screen saver is generated in the V-RAM 11 and continues to be displayed on the CRT as the display 18 (steps ST8 and ST9).

Thus, an animation or the like preliminarily set as described with reference to FIGS. 4 to 7 is displayed in accordance with the selected channel.

While the broadcasting system according to this preferred embodiment employs a fixed scrambling method applied to a video signal, the user may operate the receiver 2A to arbitrarily select any preset screen saver and display it. Further, when the ID of a certain receiver 2A is the same as the ID contained in the broadcasting signal received, a specific screen saver is suitably displayed to hinder a specific user from viewing the whole or a part of a video image.

Figure 9:
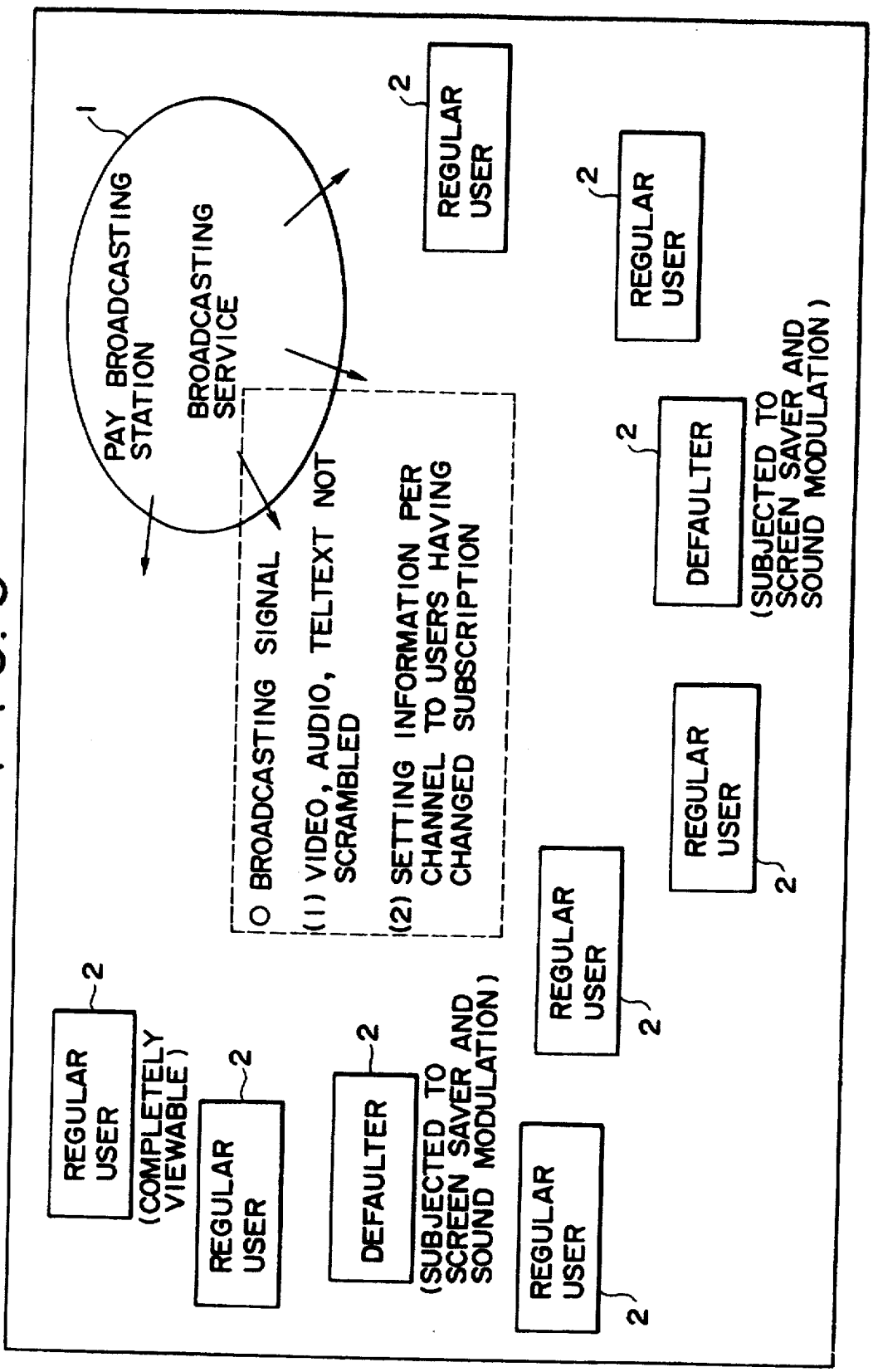
FIG. 9 is a schematic block diagram showing the general configuration of a broadcasting channel lock system according to a second embodiment of the present invention.

Referring next to FIG. 9, there is shown a second preferred embodiment of the broadcasting channel lock system according to the present invention, in which all users are supplied with a broadcasting signal not scrambled, and a function of modulating sound in the broadcasting signal is added to the function of displaying a screen saver on a screen of each receiver. In this preferred embodiment, the same parts as those in the first preferred embodiment will be denoted by the same reference numerals, and the explanation thereof will be omitted.

The system according to this preferred embodiment will be described in more detail in respect of the following items.

[4] Broadcasting System Not Employing Any Scrambling Method

[5] Configuration of Receiver 2

[6] Channel Selection Processing

These items will be referred to in the above order of arrangement.

[4] Broadcasting System Not Employing Any Scrambling Method

As shown in FIG. 9, the broadcasting system employing the broadcasting channel lock system according to the second preferred embodiment is designed so that a broadcasting signal not scrambled is transmitted from a pay broadcasting station 1 as broadcasting means and is received by receivers 2 as receiving means owned by all subscribers.

In particular, a video signal received by the receivers 2 owned by defaulters of all the subscribers is subjected to a screen saver, and an audio signal received by the receivers 2 owned by the defaulters is subjected to sound modulation, so as to make the broadcasting signal received by the defaulters not completely viewable or intelligible.

A degree of application of the screen saver and the sound modulation, that is, a degree of unintelligibility of the broadcasting signal is set according to level setting information for each channel contained in the broadcasting signal transmitted to all subscribers.

This level setting information represents the degree of unintelligibility by dividing it into a plurality of video levels and audio levels, and simply identifying these levels in figures or the like.

Each receiver 2 incorporates a software (program) for displaying various kinds of screen savers corresponding to the plurality of video levels add a program for performing various kinds of sound modulations corresponding to the plurality of audio levels.

When the level setting information is received by each receiver 2, it is stored into an S-RAM provided in the receiver 2, and the screen saver display program and the sound modulation program corresponding respectively to the video level and the audio level preset in the level setting information according to the individuality of all the subscribers are executed upon channel selection.

Further, the pay broadcasting station 1 is provided with a cable box ID given an ID or identification number unique to each subscriber, so as to identify the receiver 2 owned by each subscriber. Thus, the pay broadcasting station 1 can identify all the subscribers and evaluate or determined the circumstances of use of the broadcasting, the circumstances of nonpayment of the fee, etc. with respect to each subscriber.

Figure 10:
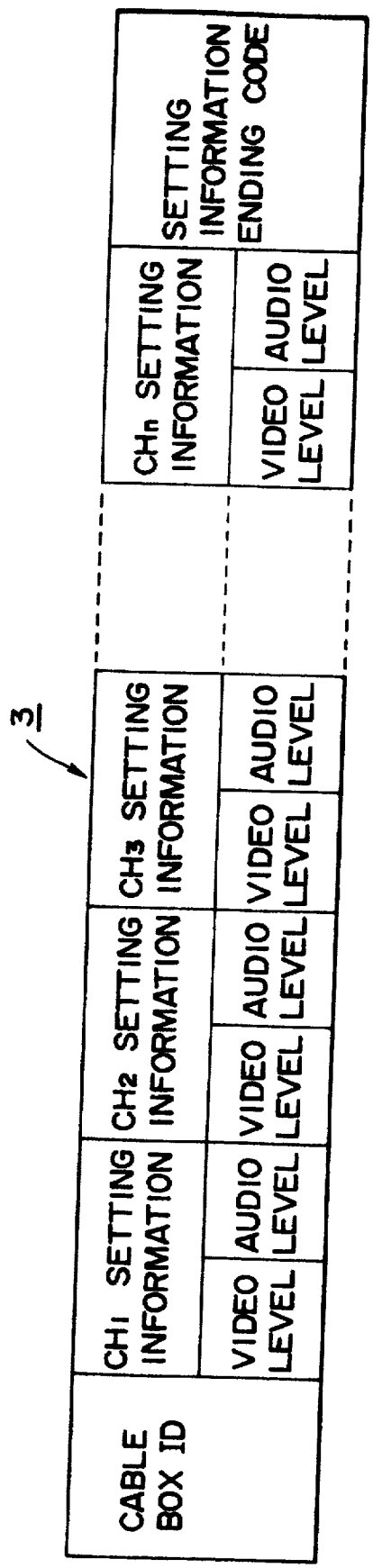
FIG. 10 is a view illustrating the configuration of a cable box ID contained in a broadcasting signal.

As shown in FIG. 10, the cable box ID has n channels CH1 to CHn in which the level setting information for each channel which corresponds to the ID of each subscriber is multiplexed to generate multiplex data 3, which is contained in the broadcasting signal transmitted.

Each level setting information per channel in the multiplex data 3 is composed of the plural video levels and the plural audio levels as mentioned above. For example, both of the plural video levels and the plural audio levels am represented by figures "0" to "5". As shown in FIGS. 11 and 12, these figures correspond to variations in a visible condition of video images and in an audible condition of sound.

Figure 13:
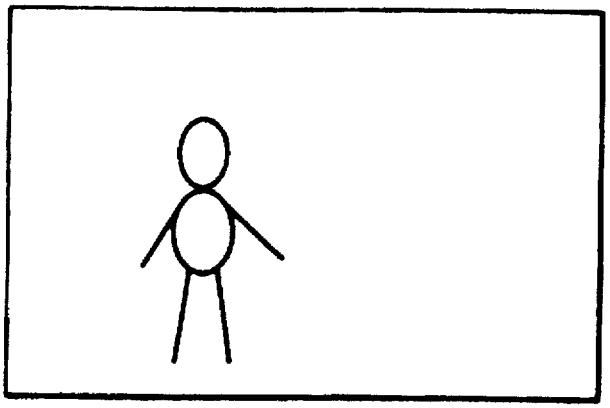
FIG. 13 is a view illustrating a Level 0 condition of displayed video.
Figure 14:
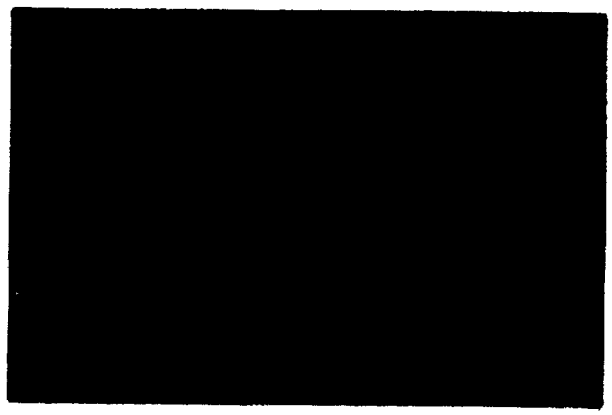
FIG. 14 is a view illustrating a Level 2 condition of displayed video.
Figure 15:
FIG. 15 is a view illustrating a Level 3 condition of displayed video.
Figure 16:
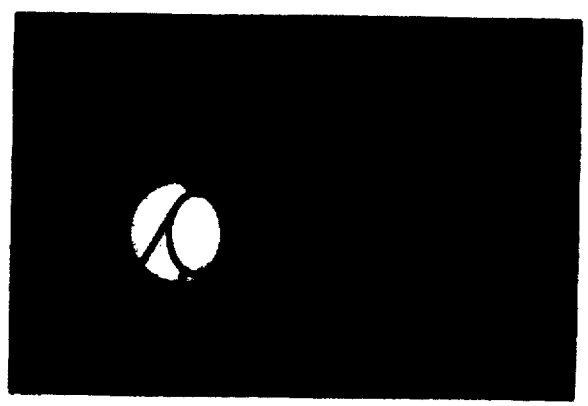
FIG. 16 is a view illustrating a Level 4 condition of displayed video.

More specifically, as an example of the video levels shown in FIG. 11, the level 0 of the setting information corresponds to a completely visible condition as shown in FIG. 13; the level 1 corresponds to relatively low, or little, level of invisibility, or invisibility refers to the lack of a visible the display, or crt, screen invisible condition; the level 2 corresponds to a more invisible condition as shown in FIG. 14; the level 3 corresponds to a completely invisible condition as shown in FIG. 15; the level 4 corresponds to a partially visible condition where a part of the original video image can be viewed as shown in FIG. 16; and the level 5 corresponds to a stroboscopically visible condition.

On the other hand, as an example of the audio levels shown in FIG. 12, the level 0 of the setting information corresponds to a completely audible condition; the lever 1 corresponds to a little inaudible condition, with noise or low level of inaudibility, or intelligibility; the level 2 corresponds to a more inaudible condition with noise; the level 3 corresponds to a completely inaudible condition with noise; the level 4 corresponds to a selectively audible, or sometimes sometimes audible, condition; and the level 5 corresponds to a mute condition.

Accordingly, the setting information of each video level and the setting information of each audio level may be suitably combined to thereby set an optimum environment for the screen saver. Of course, the setting information of each level shown in FIGS. 11 and 12 may be modified as desired.

In generating the multiplex data 3 shown in FIG. 10, the pay broadcasting station 1 preparing the video levels and the audio levels mentioned above checks the circumstances of payment of the fee per channel for each subscriber. Then, the regular level setting information for each channel for the regular subscribers having paid the fee is set to the level 0 in both the video level and the audio level by the pay broadcasting station 1, whereas the level setting information for each channel for the defaulters is set to any of the levels 1 to 5 in the video and audio levels by the pay broadcasting station 1, thus, precluding listening and/or viewing of full broadcast program material. The decision of any of the levels 1 to 5 is made by the pay broadcasting station 1.

The receiver 2 owned by each subscriber includes a channel selection system employing a tuner, a display system mainly composed of a CRT, an audio system mainly composed of a speaker, a remote control system employing a remote commander to be operated by the user, and a controller mainly composed of a CPU for generally controlling each system mentioned above.

The receiver 2 also has a ROM for preliminarily storing programs for performing or generaling, the various screen savers and sound modulations which correspond to the different levels, and is ready for executing the programs corresponding to the video level and the audio level set according to the ID of each subscriber.

That is, the receiver 2 receives the broadcasting signal from the pay broadcasting station 1 and performs channel selection and video/audio processing under control of the controller executing the programs in response to a command signal from the remote commander in the following manner.

First, the level setting information corresponding to the ID of each subscriber contained in the broadcasting signal is decoded and stored into an S-RAM provided in the receiver 2. When the user operates the remote commander to select a desired channel, the controller controls to display on the CRT the screen saver corresponding to the video level set in accordance with the level setting information stored in the S-RAM, and also controls to modulate the sound to be output from the speaker at the audio level set in accordance with the level setting information stored in the S-RAM. As a result, the degree of unintelligibility of the broadcasting is controlled to become the set level.

Accordingly, the regular subscriber can obtain clear or visible video and clear or audible or intelligible sound each at the level 0 per channel, whereas the defaulters can merely obtain unclear or at least partially invisible video and unclear or inaudible or unintelligible sound each at any of the levels 1 to 5.

In this manner, specific users are inhibited from obtaining clear, or visible, video and clear, or audible, sound per channel, thereby stimulating the interest of the users with regard to the contents broadcast program in the channel and hopefully raising the desire of the viewer take a new subscription or remit payment.

Although the degree of unintelligibility of both the video and the sound is divided into the levels 0 to 5 in this preferred embodiment, the number of the levels may vary from more levels to fewer levels without departing the scope of the appended claims.

The kinds of the screen savers and the kinds of the sound modulations corresponding to the levels are set by the pay broadcasting station 1, and the setting of these kinds in the receivers 2 is suitably changed by the pay broadcasting station 1 through the broadcasting signal.

Further, the most effective allocation of any of the levels 1 to 5 to the defaulters may be selectively decided and changed by the pay broadcasting station 1.

[5] Configuration of Receiver 2

Figure 17:
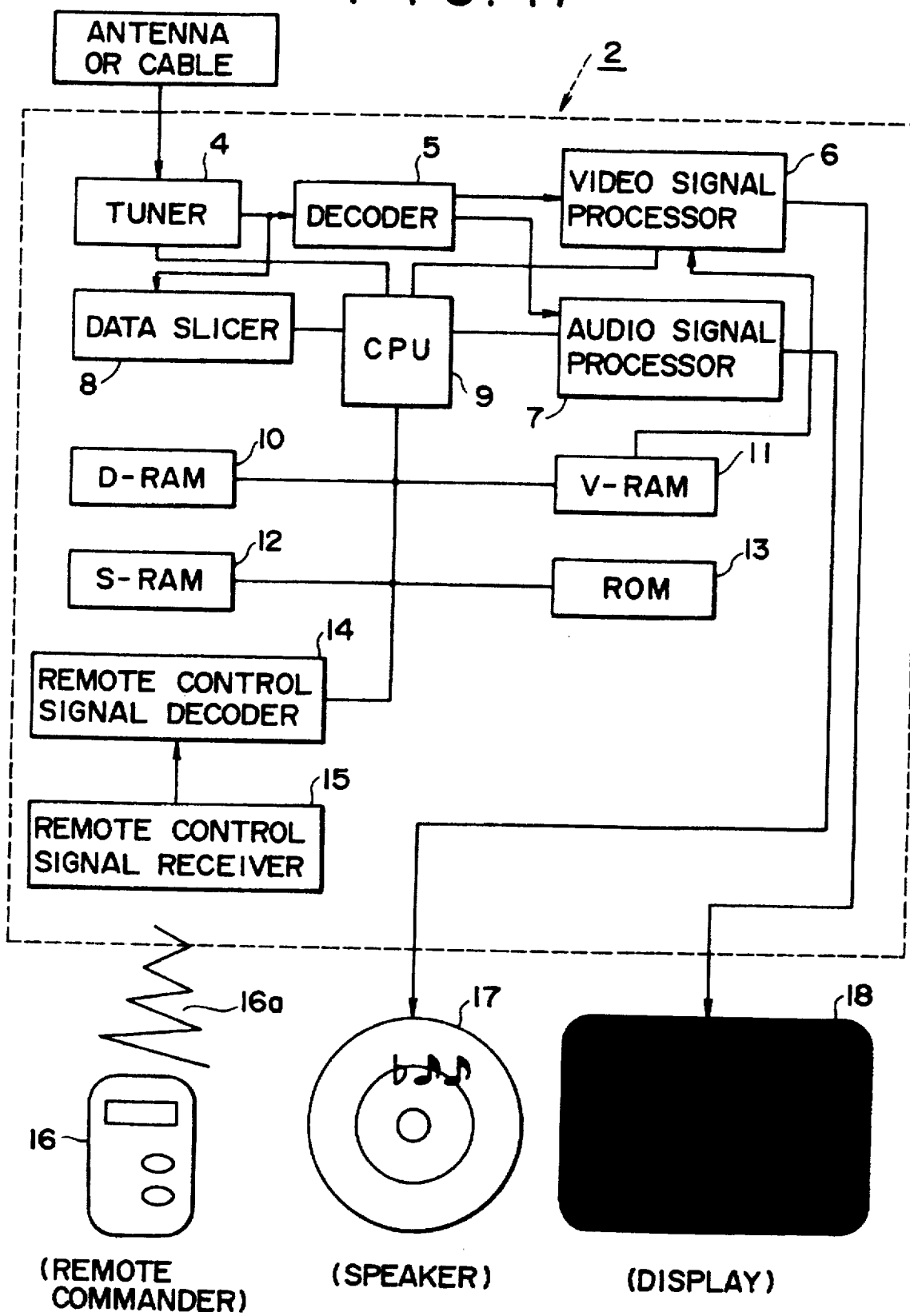
FIG. 17 is a block diagram showing the configuration of a receiver of a second embodiment of the present invention.

As shown in FIG. 17, each receiver 2 includes a tuner 4, decoder 5, video signal processor 6, audio signal processor 7, data slicer 8, CPU 9, D-RAM 10, V-RAM 11, S-RAM 12, ROM 13, remote control signal decoder 14, remote control signal receiver 15, remote commander 16, speaker 17, and display 18.

The above circuit blocks 4 to 18 have the following connection conditions and various functions.

The tuner 4 has an input connected to an antenna or a cable, an output connected to the decoder 5, and a control terminal connected to a given control port of the CPU 9. Accordingly, the tuner 4 functions to select under control of the CPU 9 a channel designated by the remote commander 16 from a plurality of channels contained in or transmitted by the broadcasting signal received by the antenna or the cable and to output the signal of the selected channel to the decoder 5.

The decoder 5 has an input connected to the tuner 4, outputs connected to the video signal processor 6 and the audio signal processor 7, and a control terminal connected to a given control port of the CPU 9. Accordingly, the decoder 5 functions to separate a video/audio signal of signals output from the tuner 4 under control of the CPU 9 and to output a video signal to the video signal processor 6 and an audio signal to the audio signal processor 7.

The video signal processor 6 has inputs connected to the decoder 5 and the V-RAM 11, an output connected to the display 18, and a control terminal connected to a given control port of the CPU 9. Accordingly, the video signal processor 6 functions to merge the video signal output from the decoder 5 and image data output from the V-RAM 11 at every given period and thereby to supply picture element data per screen of the display 18 to the display 18.

The audio signal processor 7 has an input connected to the decoder 5, an output connected to the speaker 17, and a control terminal connected to a given control port of the CPU 9. Accordingly, the audio signal processor 7 functions to perform sound modulation to the audio signal output from the decoder 5 under control of the CPU 9 and thereafter to supply a modulated audio signal to the speaker 17.

A data slicer 8 has an input connected to the tuner 4 and an output connected to a given control port of the CPU 9. Accordingly, the data slicer 8 functions to extract only the multiplex data of the level setting information from the signals output from the tuner 4 and to output to the CPU 9 the level setting information relating to the ID of each subscriber. The level setting information is then stored into the S-RAM 12 in accordance with the CPU 9.

The CPU 9 is connected to almost all the other circuit blocks, and functions to execute the programs to communicate signals between the circuit blocks, thereby generally controlling the operation of the receiver 2. Further, since the broadcasting signal to be received by the receiver 2 is not scrambled, the CPU 9 excludes a function of descrambling the broadcasting signal, thereby reducing a time period from reception to display.

The D-RAM 10 is a so-called dynamic RAM, and functions to provide a working area when the CPU 9 executes the programs.

The V-RAM 11 functions to store image data per screen for displaying a screen saver. This image data is generated by the CPU 9 with use of graphic data and font data stored in the ROM 13.

The S-RAM 12 is a so-called static RAM, which is constructed as a nonvolatile memory and is connected to the CPU 9. The S-RAM 12 functions to store tables of the level setting information corresponding to the ID of each subscriber (see FIGS. 11 and 12) under control of the CPU 9. The contents of the tables are updated every time the level setting information is broadcast.

The ROM 13 is a read only memory, which is connected to the CPU 9. The ROM 13 preliminarily stores various programs and fixed data such as graphic data for displaying animations and font data for displaying characters. A required one of the programs is read from the ROM 13 and is executed by the CPU 9. The graphic data and the font data are read by the CPU 9 when the image data mentioned above is generated.

The remote control signal decoder 14 has an input connected to the remote control signal receiver 15 and an output connected to a given control port of the CPU 9. Accordingly, the remote control signal decoder 14 functions to decode a remote control signal 16a received by the remote control signal receiver 15 and output the decoded signal to the CPU 9.

The remote control signal receiver 15 is provided at a suitable position on a front surface or the like of the receiver 2 so as to receive the remote control signal 16a. The remote control signal receiver 15 has an output connected to the remote control signal decoder 14.

The remote commander 16 is operated by the user to output infrared radiation or the like indicative of the remote control signal 16a composed of data with a superimposed command of a desired channel to be selected, etc.

The speaker 17 functions to convert an output signal from the audio signal processor 7 to sound and output the sound.

The display 18 is a so-called CRT and functions to display an output signal from the video signal processor 6, that is, a video image per screen obtained by merging the video signal from the decoder 5 and the image data from the V-RAM 11 at a given period. Accordingly, a screen saver such as an animation is displayed on the CRT by rewriting the contents of this image data at the given period.

The operation of the receiver 2 having the above configuration will now be described particularly in relation to processing upon channel selection.

[6] Channel Selection Processing

The receiver 2 monitors the multiplex data 3 (see FIG. 10) contained in the broadcasting signal received, separates the video/audio signal output from the tuner 4 into the video signal and the audio signal, and feeds the video signal to the video signal processor 6 and the audio signal to the audio signal processor 7.

The receiver 2 extracts the multiplex data 3 from the output signal from the tuner 4 in the data slicer 8, extracts the level setting information corresponding to the ID of each subscriber (see FIGS. 11 and 12) from the multiplex data 3, and stores the level setting information into the S-RAM 12.

Figure 18:
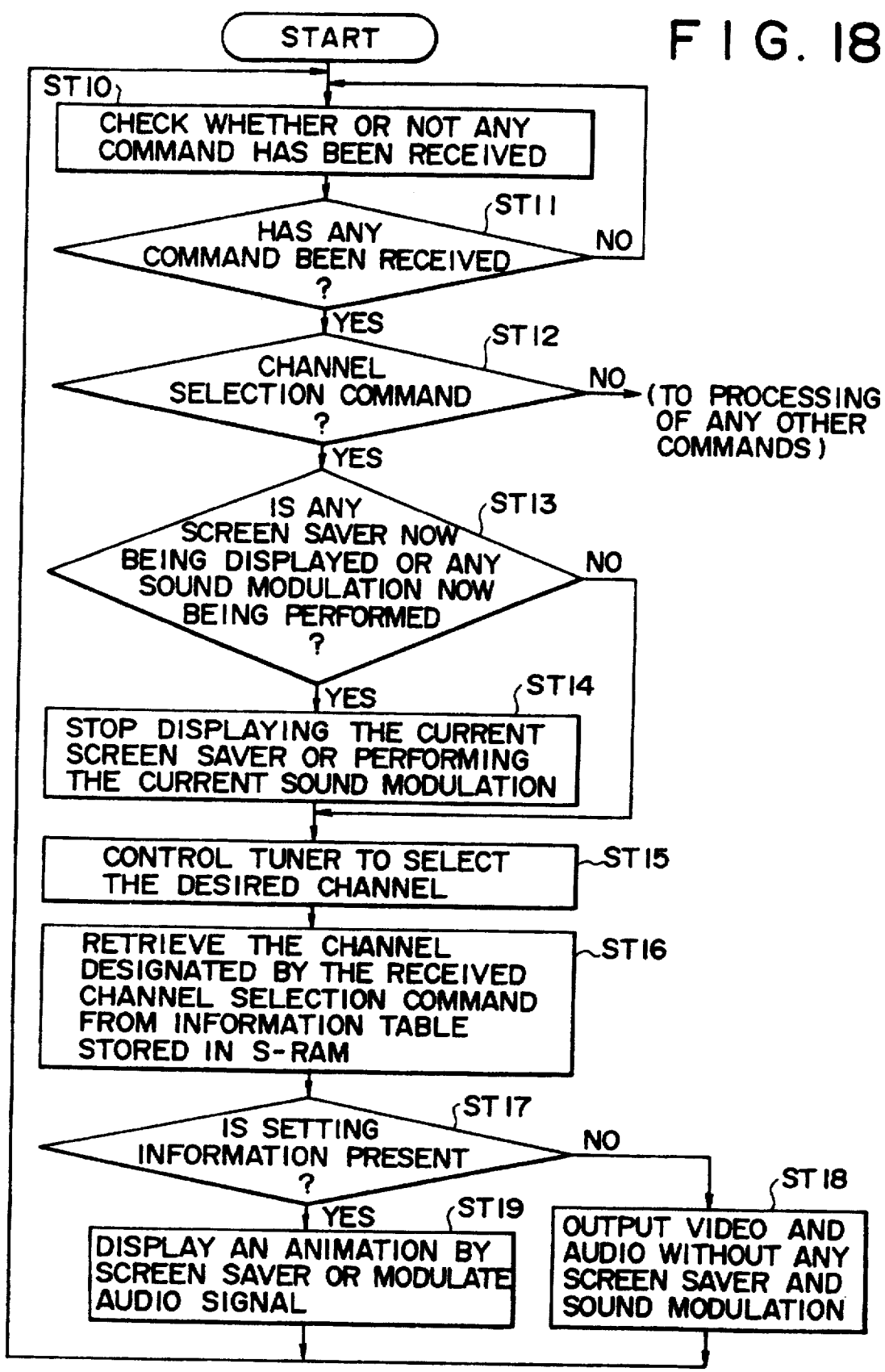
FIG. 18 is a flowchart of a channel selection process performed by a receiver of the present invention.

As shown in FIG. 18, the receiver 2 receives infrared radiation(signal) from the remote commander 16, decodes it, and checks whether or not any command has been received (step ST10).

When the user depresses any channel button of the remote commander 16 during viewing to select a desired channel, a command signal is generated from the remote commander 16. This command signal is received by the remote control signal receiver 15 and is then input into the remote control signal decoder 14, in which the command signal is decoded (step ST11).

If any command has been received and the command signal decoded is a channel selection command, the program proceeds to step ST13, whereas if the command signal decoded is not a channel selection command, any other programs are executed (step ST12).

If the command signal decoded is a channel selection command, the CPU 9 determines whether or not any screen saver is being displayed or any sound modulation is being performed in a current channel (step ST13).

If any screen saver is now being displayed or any sound modulation is now being performed, the CPU 9 controls the decoder 5 to stop displaying the screen saver or stop performing the sound modulation in the current channel, and thereafter controls the tuner 4 to select the desired channel designated by the command signal (step ST13: Yes; steps ST14 and ST15).

If no screen saver is now being displayed or no sound modulation is now being performed, the CPU 9 controls the tuner 4 to select the desired channel designated by the command signal (step ST13: No; step ST15).

Then, the CPU 9 searches the level setting information (see FIGS. 11 and 12) stored in the S-RAM 12 (step ST16), and checks the video level and the audio level set in the channel designated by the command signal (step ST17).

If the level setting information is absent (i.e., both the video level and the audio level are 0), the original video images and the original sound in the channel designated by the command signal are output to the display 18 and the speaker 17, respectively, without any screen saver and any sound modulation (step ST17: No; step ST18). Then, the program awaits the next command signal.

If the level setting information is present (i.e., the video signal or the audio level is any of the levels 1 to 5), the CPU 9 generates (synthesizes) in the V-RAM 11 image data for the screen saver corresponding to the video level set in the level setting information by reading the screen saver generating program, graphic data, and font data preliminarily stored in the ROM 13 corresponding to the video level and utilizing the D-RAM 10 as a working area for computation (step ST17: Yes; step ST19).

The image data generated in the V-RAM 11 is merged with the video signal output from the video signal processor 6 under control of the CPU 9. The output from the video signal processor 6 is input into the display 18 as the CRT. As a result, the video image broadcast is merged with the screen saver to be displayed on the CRT.

Further, the sound modulation corresponding to the audio level set in the level setting information is applied to the broadcast sound, and is fed to the speaker 17 (step ST17: Yes; step ST19).

In this manner, a broadcasting signal not scrambled is supplied to each receiver 2, and any suitably selected screen saver and/or sound modulation are/is applied to the broadcasting signal at the side of the receivers 2 owned by the nonsubscribers or the defaulters. Accordingly, a time period required for descrambling a scrambled broadcasting signal can be eliminated, and the regular users can be surety provided with the broadcasting signal.

As described above, the channel lock system according to the present invention exhibits the following effects.

(1) The channel lock system comprises broadcasting means for transmitting a broadcasting signal composed of a plurality of channels, and a plurality of receiving means for receiving the broadcasting signal, wherein the broadcasting signal contains a signal for controlling each receiving means, and each receiving means is provided with locking means for limiting a video and/or an audio in a specific channel. Accordingly, a burden on the broadcasting means can be greatly reduced to effect locking of the specific channel. As a result, a scrambling method for the broadcasting signal can be fixed, or the need of scrambling of the broadcasting signal can be eliminated. When scrambling of the broadcasting signal is eliminated, multiplex broadcasting with scrambling patterns, any system of changing descrambling patterns in a decoder, or a change itself of the scrambling method becomes unnecessary, thereby reducing a time period for descrambling the broadcasting signal to greatly quicken channel selection. Further, when no video image is displayed upon channel selection, the user can easily recognize that this condition is caused neither by any damage in a television set or the like nor by selection of an undefined channel, i.e., a channel in which no broadcasting is made. Further, when broadcasting in a certain channel is undesirable for a specific user, e.g., a child, to view, such a channel can be easily locked.

(2) The locking of the specific channel is performed according to the ID numbers of the receivers. Accordingly, setting change data in an amount corresponding to the number of IDs of specific users having changed the subscription or defaulters can be broadcast, so that decoding information in broadcasting multiplex data can be greatly reduced as compared with the conventional system.

(3) The locking means for locking the channel to limit the video includes means for displaying a screen saver on a display screen. Further, a plurality of kinds of screen savers are preliminarily set and one of them can be arbitrarily selected. Accordingly, the user can easily recognize the contents, kind, station name, etc. of the selected channel according to the design of the screen saver selected. Further, depending on the design of the screen saver to be selected, the screen saver can be used also as a display interior design such as an environmental video to give the user mental relaxation. Further, as in music broadcasting/data broadcasting, a meaningless video image can be refrained from being displayed. In case of selecting a channel in which a video image on the CRT screen remains unchanged, sticking of the CRT screen can be prevented.

(4) The video image in the specific channel is overlaid with the screen saver. For example, the video image in the selected channel may be partially viewed through a part of an animation as the screen saver, thereby letting the user imagine the contents of the broadcasting in this channel. Further, the video image in the channel locked is made hardly viewable or partially viewable, thereby allowing the user to partially view the video image and letting the user imagine the contents of the broadcasting. Thus, the user is indirectly urged to newly subscribe for reception or pay the fee.

(5) The locking means for limiting the video and/or audio sets level setting information relating to the video to a plurality of levels ranging from a completely visible condition to a completely invisible condition and/or level setting information relating to the audio to a plurality of levels ranging from a completely audible condition to a completely inaudible condition. Accordingly, in addition to setting of the completely invisible condition, the video image can be made hardly visible and/or the sound can be made hardly audible. Thus, a degree of unintelligibility of the video and the audio can be finely controlled, which cannot be realized by a conventional image erasing function. For example, the video image on the screen can be made hardly visible as a whole, or it can be made intermittently visible as with a stroboscope, thus realizing various screen conditions in order to let the user imagine the contents of the broadcasting and thereby indirectly urge the user to newly subscribe for reception or pay the fee.

(6) The locking means for limiting the video includes a screen saver, and this screen saver is displayed so as to overlay a video image in a specific channel. Accordingly, the video image can be made partially viewable through an animation as the screen saver, thereby letting the user imagine the contents of the broadcasting and indirectly urging the user to newly subscribe, etc.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A broadcasting channel lock system comprising:

broadcasting means for transmitting a broadcasting signal via one of a plurality of available channels;

receiving means for receiving said broadcasting signal and including a video display, a controller and memory for providing a screen saver for display, and a video signal merge processor for superimposing the screen saver on a video image, wherein said broadcasting signal includes a control signal for controlling said receiving means to display the screen saver superimposed on the video image so as to prevent or lock a selected channel from being fully intelligible.

2. A broadcasting channel lock system according to claim 1, wherein control of said receiving means by said control signal is performed according to ID code information contained in said control signal.

3. A broadcasting channel lock system according to claim 2, wherein said receiving means for includes means for displaying said screen saver on a display screen.

4. A broadcasting channel lock system according to claim 3, wherein said screen saver is displayed on said display screen so as to make said video hardly visible or partially visible.

5. A broadcasting channel lock system according to claim 2, wherein said receiving means for sets a degree of unintelligibility of an audio portion of said broadcasting signal to a plurality of levels ranging from a completely audible condition to a completely inaudible condition.

6. A broadcasting channel lock system comprising:

broadcasting means for transmitting a broadcasting signal via one of a plurality of available channels, said broadcasting signal including a control signal; and receiving means for receiving said broadcasting signal, said receiving means including channel locking means for limiting reception of video or audio on a specific one of said channels to be locked by displaying a screen saver to prevent said specific channel from being fully intelligible, said locking means being responsive to said control signal.

7. A broadcasting channel lock system according to claim 6, wherein said locking means is responsive to ID code information contained in said control signal. invisible condition.

8. A broadcasting channel lock system according to claim 7, wherein said locking means for limiting said video includes means for displaying said screen saver on a display screen.

9. A broadcasting channel lock system according to claim 8, wherein said screen saver is selected from a plurality of kinds of screen savers.

10. A broadcasting channel lock system according to claim 8, wherein said screen saver is displayed on said display screen so as to overlay said video in said specific channel to be locked.

11. A broadcasting channel lock system according to claim 10, wherein said locking means sets a degree of unintelligibility of said video according to a setting information signal contained in said broadcasting signal.

12. A broadcasting channel lock system according to claim 8, wherein said screen saver is displayed on said display screen so as to make said video hardly visible or partially visible.

13. A broadcasting channel lock system according to claim 6, wherein said locking means for limiting reception of video or audio sets a degree of unintelligibility of said video to a plurality of levels ranging from a completely visible condition to a completely invisible condition.

14. A broadcasting channel lock system according to claim 3, wherein said degree of unintelligibility is set according to a setting information signal contained in said broadcasting signal.

15. A broadcasting channel lock system according to claim 6, wherein said locking means for limiting said audio sets a degree of unintelligibility of said audio to a plurality of levels ranging from a completely audible condition to a completely inaudible condition.

16. A broadcasting channel lock system according to claim 15, wherein said degree of unintelligibility of said audio is set according to a setting information signal contained in said broadcasting signal.

17. A broadcasting channel lock system comprising:
broadcasting means for transmitting a broadcast signal via one of a plurality of available channels, said broadcasting signal including control signal information and said broadcasting means including means for generating said control signal information; and
a receiver for receiving said broadcasting signal comprising:
channel locking means responsive to said control signal information;
first storage means for storing screen saver information;
second storage means for storing a preset ID code; and
a comparator for comparing said control signal information received from said broadcasting means with said preset ID code stored in said second storage means, wherein
said channel locking means includes means for displaying on a display device a screen saver video represented by said screen saver information stored in said first storage means when said comparator determines that said control signal information and said preset ID code stored in said second storage means are not identical.

18. A broadcasting channel lock system according to claim 17, wherein said control signal information includes ID code information.

19. A receiver for receiving a broadcast signal comprising:
channel locking means responsive to control signal information broadcast from a broadcasting means;
first storage means for storing screen saver information;
second storage means for storing a preset ID code; and
a comparator for comparing said control signal information received from said broadcasting means with said preset ID code stored in said second storage means, wherein
said channel locking means includes means for displaying on a display device a screen saver video represented by said screen saver information stored in said first storage means when said comparator determines that said control signal information and said preset ID code stored in said second storage means are not identical.

20. A receiver for receiving a broadcast signal according to claim 19, wherein said channel locking means is selectably controllable to limit a degree to which said screen saver video is displayed on said display device.

21. A receiver for receiving a broadcast signal according to claim 19, wherein said broadcast signal is received via a cable.

* * * * *